United States Patent [19]

Schmidt

[11] Patent Number: 4,925,904
[45] Date of Patent: May 15, 1990

[54] COMPOSITIONS CONTAINING STABILIZED UNSATURATED POLYESTER RESINS

[75] Inventor: Arno P. O. Schmidt, Abstatt, Fed. Rep. of Germany

[73] Assignee: Hilti Aktiengesellschaft, Fürstentum, Liechtenstein

[21] Appl. No.: 228,247

[22] Filed: Aug. 4, 1988

[30] Foreign Application Priority Data

Aug. 31, 1987 [JP] Japan .................................. 3729054

[51] Int. Cl.$^5$ ........................................... C07D 279/70
[52] U.S. Cl. .................... 526/205; 525/345; 525/349; 525/375
[58] Field of Search ................ 526/205; 525/345, 349, 525/375

[56] References Cited

U.S. PATENT DOCUMENTS

| | | | |
|---|---|---|---|
| 3,912,606 | 10/1975 | Pacifici et al. | 526/205 |
| 4,209,604 | 6/1980 | Werber | 526/205 |
| 4,431,787 | 2/1984 | Werber | 526/205 |
| 4,460,760 | 7/1984 | Okamoto et al. | 526/205 |
| 4,569,977 | 2/1986 | Werber | 526/205 |

Primary Examiner—John Kight, III
Assistant Examiner—Kriellion Morgan
Attorney, Agent, or Firm—Toren, McGeady & Associates

[57] ABSTRACT

A new composition is disclosed which contains a cross linkable unsaturated polyester and a phenothiazine. The new composition has substantially improved shelf life and is particularly useful as an adhesive and for trowelling.

15 Claims, No Drawings

COMPOSITIONS CONTAINING STABILIZED UNSATURATED POLYESTER RESINS

BACKGROUND OF THE INVENTION

This invention pertains to stabilized unsaturated polyester resin compositions, and more particularly to unsaturated polyester resin compositions containing an improved inhibitor.

Compositions which contain unsaturated polyesters and which can be cross linked, whether or not they are reinforced, have achieved exceptional importance. Among the many uses for such compositions are casting, impregnating, troweling, and spraying processes in the electrical industry, container construction, construction of buildings, ship building, the motor vehicle industry, etc. for coating and bonding. Molded articles of different kinds and for different purposes can be produced from reinforced compositions by manual deposition, by pressing and fiber spraying processes and the like.

For processing, compositions containing unsaturated polyesters are mixed with cross linking agents, which preferably comprise monovinyl compounds or polyfunctional polymerizable compounds, are provided with catalysts and accelerators, and then cured at room temperature or elevated temperature. However, the shelf life of compositions containing unsaturated polyester and, optionally, cross linking agents is limited and dependent on the temperature and time. After awhile, gelling occurs with an accompanying increase in viscosity, which interferes with processing.

It is well known that to avoid premature curing of unsaturated polyester compositions in the absence of catalysts, inhibitors may be added such as phenol derivatives, for example, t-butylcatechol, quinone, hydroquinone, phosphite esters, ammonium salts, sulfur, iodine, organosilicon compounds, etc. Nevertheless, manufacturers usually guarantee a satisfactory quality for a period of only six months. On the other hand, manufacturers of half-finished products generally demand warranty times of six to twelve months. In view of the fact that there is little control over transport and storage conditions, such warranty periods are exceedingly uncertain. While it may be assumed that stability or shelf life will be increased with increased amounts of inhibitor, as a rule, the polymerizability and cross linkability, as well as the rate of polymerization and cross linking reactions are affected unfavorably by the addition of inhibitors. The detrimental effect of inhibitors on the curing properties of cross linkable polyester compositions is a serious disadvantage.

SUMMARY OF THE INVENTION

An object of the invention is the provision of a composition which contains cross linkable unsaturated polyester and which has a shelf life which is superior to that of known compositions.

Another object of the invention is the provision of a cross linkable unsaturated polyester composition which has improved shelf life as well as good curing properties.

A further object of the invention is the provision of a cross linkable unsaturated polyester composition which contains an improved inhibitor.

Still another object of the invention is the provision of a cross linkable unsaturated polyester composition which contains an improved inhibitor, whereby the shelf life of the composition is improved without detriment to the curing properties thereof.

These and other objects are obtained by the invention which involves a cross linkable composition comprising unsaturated polyester and an inhibitor which is a phenothiazine.

According to a preferred embodiment of the invention, the cross linkable composition is comprised of unsaturated polyester, a phenothiazine and an amine.

DETAILED DESCRIPTION OF INVENTION

The cross linkable compositions of the invention contain esters of polyalcohols and saturated and unsaturated polycarboxylic acids. Maleic acid or maleic anhydride, and fumaric acid are the principal unsaturated polycarboxylic acids used, while o-phthalic acid, isophthalic, tetrahydrophthalic, adipic acid and the like are generally used as the saturated polycarboxylic acids. Examples of useful polyalcohols include ethylene glycol, 1,3-propylene glycol, neopentyl glycol, 1,3-butylene glycol and glycerin.

Generally, the unsaturated polyester resins are contained in solutions of reactive solvents, i.e. solvents which are copolymerizable with the polyester resin. The most important reactive monomer, i.e. solvent, is styrene; however, other monomers can be used, such as t-butyl acrylate, diallyl phthalate and triallyl cyanurate, (Houwink - Stavermann, *Chem. und Physik. Grundlagen der Kunstoffe, Akad. Verlagsgesellschaft Leipsig,* 1962)

Solutions of polyester resins, particularly solutions of amino preaccelerated glycol-fumarate-phthalate resins, for example, having the following characteristics have been found to be especially suitable:

| styrene content: | 35% |
| --- | --- |
| acid number: | 30 mg. KOH/g. |
| viscosity: | 1100 cP |
| density: | 1.12 g./ml. |
| refractive index at 20° C.: | 1.53 |
| flash point: | 34° C. |

The compositions of the invention may or may not be reinforced. When reinforced, the customary reinforcing agents, especially mineral additives, including fibers such as fiberglass, may be used.

The polyester resin compositions may also contain a cross linking agent, which is preferably a copolymerizable compound. Among the useful cross linking agents are monovinyl compounds, polyfunctional compounds and polymerizable compounds generally. The best known monovinyl compound which can be used for the cross linking reaction is styrene. In addition to, or instead of this reactive diluent, cross linking agents such as acrylic acid, acrylic acid derivatives such as isobutyl methacrylate, for example, and similar monovinyl compounds may be utilized. As polyfunctional polymerizable compounds, divinylbenzene, N,N-divinylurea, N,N-divinylcyanamide, allyl compounds, especially allyl esters of carboxylic acids -such as diallyl phthlate, diallyl maleate, dallyl fumarate and strong cross linking agents such as triallyl cyanurate are suitable. Other types of cross linking agents such as isocyanates are not excluded and also may be used in the compositions of the invention.

According to the invention, the stablilizer for the polyester resin composition is a phenothiazine. Phenothiazine itself has been found to be an especially good inhibitor. In addition, phenothiazines which have one to three substituents on the phenothiazine ring, wherein the substituent is selected from alky, alkoxy, alkylamino, dialyamino, amino, nitro and halo groups, wherein the alkyl group in each case contains 1 to 6 carbon atoms, most preferably 1 carbon atom, and wherein the halo group is preferably a chlorine, bromine or iodine atom are also useful inhibitors of the invention. Preferable phenothiazines contain from 0 to 1 substituent.

The phenothiazines are generally used in an amount of 0.0015 to 0.1% by weight, and preferably in an amount of 0.01 to 0.075% by weight, based on the weight of the unsaturated polyester. However, the phenothiazines may be used in greater or lesser amounts, for example, 0.5 or up to 1 5% by weight, if desired As shown by stability tests, the compositions of the invention have excellent stability against gelling. The stability of polyester resin compositions containing inhibitor according to the invention has been tested in the usual manner by tempering trials, wherein tempering of respective samples was conducted at 85° C. Even after several days of tempering, compositions of the invention showed no noticeable increase in viscosity and no change in gelling behavior. Moreover, a slight increase in the gelling times was observed. These results have been fully confirmed in practice.

The compositions of the invention can be cured with the cross linking agent present in the composition by addition of the customary catalysts, especially free radical catalysts. Suitable free radical catalysts include particularly, peroxides and hydroperoxides, preferably benzoyl peroxide, cumene hydroperoxide, t-butyl hydroperoxide, lauroyl methyl ethyl ketone peroxide and/or cyclohexanone peroxide. The peroxide may be added to the composition in powder or paste form in the usual quantities, ranging, for example, from 0.5 to 4% by weight, based on the weight of unsaturated polyester. Also, common accelerators, for example, heavy metal salts such as cobalt salts or mercaptans may be used.

According to a particularly preferred embodiment of the invention, the compositions of unsaturated polyester, which may or may not contain a cross linking agent, additionally contain one or more amines. While any amine may be used, it has been found that secondary amines are preferable to primary amines and that tertiary aliphatic amines are especially useful. The aliphatic amines may be linear, cyclic, and/or polycyclic; tertiary polycyclic amines, such as triethylenediamine are particularly suitable. The same-also holds true for heterocyclic amines or mixtures of heterocyclic amines with aliphatic amines, especially aliphatic tertiary amines. Aromatic amines may be used also. The amines are generally employed in amounts of 0.5 to 3% by weight, based on the weight of unsaturated polyester. Especially preferred are compositions of the invention which contain, in addition to the amine, phenothiazine in an amount of more than 0.025 by weight up to about 0.5% by weight based on the weight of unsaturated polyester.

It has been discovered that compositions of the invention which contain a combination of phenothiazine and amine as the inhibitor to stabilize the unsaturated polyester have the particular advantage of an outstanding shelf life due to a synergism between the phenothiazine compound and the amine. Moreover, after the addition of catalyst and optionally of cross linking agent, if a cross linking agent is desired and is not present, or is present in an inadequate amount, the composition polymerizes or cross links in a very short time. In fact, the compositions of the invention have curing characteristics which correspond to those of an inhibitor-free composition.

As a result of their excellent stability, compositions of the invention can be processed at higher operating temperatures. Previously, the upper tolerance limit of the processing temperature was 35° C. Now a more efficient method of production is possible, for example, the dissolver method can be used. Further, the lower viscosity of the compositions of the invention, at the higher permissible temperatures, makes it easier to fill containers therewith and appreciably greater time and temperature tolerances ar available for storage and transport. Comparable favorable results are obtained not only with acrylate resins, but also with other duroplasts, such as cross linkable aminoplasts.

The stabilized compositions of the invention, which have a low viscosity due to their low tendency to gel, have proven to be especially useful for adhesion and troweling purposes, particularly when employed in extrusion equipment, where an increase in viscosity, which can be burdensome, is avoided. The rapid curing after addition of the catalyst, achievable in spite of the high stability, make the compositions of the invention particularly advantageous for these applications. The compositions of the invention also have advantageous wetting properties, especially when monomers such as styrene, acrylic acid, methacrylic acid, isobutyl methacrylate, n-butyl methacrylate, vinylimidazole and/or perallyl ether are present as cross linking and wetting agents. Furfuryl alcohol, tetrahydrofurfuryl alcohol, and diacetone alcohol have proven to be good wetting agents. Here, as in the previously described compositions, the presence of one or more amine, in addition to the phenothiazine compound, has been found to be beneficial, and tertiary amines, such as triethylamine, are more effective than diethylamine, which is more effective than ethylamine. Heterocyclic amines, such as morpholine, a secondary amine, are also useful and are comparable in effect to other secondary amines, such as diethylamine. Particularly good results are achieved with triethylenediamine.

Compositions of the invention which contain the synergistic combination of a phenothiazine compound and amine are distinguished by yet another desirable characteristic. Cross linkable compositions containing unsaturated polyesters, phenothiazine and amine are almost colorless to yellowish. If a peroxide or hydroperoxide catalyst is added, the composition discolors immediately to a deep, dark blue. After the onset of polymerization, which corresponds to the start of gelation, the color disappears and the cured product has the same color as the starting composition. It has been found that the combination of phenothiazine compound and amine in the unsaturated polyester compositions of the invention is an indicator for the state of the mixture. Thus, it can be inferred from the color, when polymerization has commenced, i.e. when polymerization starts to lead to gel formation, whether sufficient hardener is present or more needs to be added, and finally, from previous experience, the time at which the composition has a viscosity which is still low enough to allow it to be squeezed from its container for processing, for example, from a cartridge.

The following examples further illustrate the invention, but must not be interpreted as limiting the invention in any manner.

EXAMPLE 1

A solution of a polyester resin, in an amount of 100 parts by weight, containing fumaric acid as the unsaturated acid, in 40% by weight of styrene, is mixed consecutively with:

4.89 parts/wt. of a 1% solution of phenothiazine in styrene 1.08 parts/wt. of a mixture of triethylenediamine and morpholine (in a ratio of 4:1)

The mixture is stirred after each partial addition. The uncatalyzed composition has a pot life of 296 hours at 85° C. and, after addition of 1.5% by weight of benzoyl peroxide, a gelling time of 384 seconds.

EXAMPLE 2

The compositions shown in the Table 1 were prepared with a glycolfumarate-phthalate polyester containing 38% by weight of styrene, having an acid number = 32 mg. KOH/g.; viscosity of 1150 cP and flash point of 36° C. The gelling time, i.e. the elapsed time between the addition of hardener and start of gelation, the curing time at maximum temperature and catalyst free pot life at 85° C. of each of the compositions were determined and the results set forth in Table 1. In Table 1, "Pheno" means phenothiazine and "TEDA" means triethylenediamine

TABLE 1

| Unsaturated Polyester | % Inhibitor Pheno. | % Inhibitor TEDA | Gelling Time (sec.) | Curing Time (sec.) | Pot Life 85° C. (hours) |
|---|---|---|---|---|---|
| 1C | 0 | 0 | 363–432 | 480–550 | 23 |
| 2 | 0.01 | 0 | 355 | 478 | 82 |
| 3 | 0.022 | 0 | 450 | 590 | 175 |
| 4 | 0.05 | 1.00 | 378–388 | 482–548 | 290 |

Composition 1C is a comparative example which contains no phenothiazine or triethylenediamine. Compositions 2–4 illustrate the invention.

What we claim is:

1. A cross linkable composition comprising unsaturated polyester and an inhibitor which is a phenothiazine in an amount effective to inhibit the gelling of the unsaturated polyester.

2. The cross linkable composition of claim 1, in which the phenothiazine is present in an amount of about 0.0015% to 1.5% by weight based on the weight of the unsaturated polyester.

3. The cross linkable composition of claim 1, in which the phenothiazine is present in an amount of about 0.0015 to 0.1% by weight based on the weight of the unsaturated polyester.

4. The cross linkable composition of claim 1, which further comprises a cross linking agent which is a compound copolymerizable with the unsaturated polyester.

5. The cross linkable composition of claim 4, in which the cross linking agent is a monovinyl compound or a polyfunctional compound.

6. The cross linkable composition of claim 1, in which the inhibitor is a combination of phenothiazine and an additional aliphatic or heterocyclic amine.

7. The cross linkable composition of claim 6, in which the phenothiazine is present in an amount of about 0.0015% to 1.5% by weight based on the weight of the unsaturated polyester and the additional amine is present in an amount of about 0.5 to 3.0% by weight based on the weight of the unsaturated polyester.

8. The cross linkable composition of claim 6, in which the phenothiazine is present in an amount of about 0.025% to 0.5% by weight based on the weight of the unsaturated polyester and the additional amine is present in an amount of about 0.5 to 3.0% by weight based on the weight of the unsaturated polyester.

9. The cross linkable composition of claim 6, in which the additional amine is comprised of one or more tertiary amines.

10. An adhesive composition comprising the composition defined in claim 1, in an amount effective for use as an adhesive.

11. An adhesive composition comprising the composition defined in claim 6, in an amount effective for use as an adhesive.

12. A method of inhibiting a cross linkable composition comprised of unsaturated polyester from gelling comprising adding a phenothiazine to said cross linkable composition in an amount effective to inhibit gelling.

13. A method of inhibiting a cross linkable composition from gelling according to claim 12, comprising adding a phenothiazine and an additional aliphatic or heterocyclic amine to said cross linkable composition in an amount effective to inhibit gelling.

14. A method of trowelling which comprises troweling with an effective amount of the cross linkable composition of claim 1.

15. A method of trowelling which comprises troweling with an effective amount of the cross linkable composition of claim 6.

* * * * *